(12) United States Patent
Zhao et al.

(10) Patent No.: US 11,616,251 B2
(45) Date of Patent: Mar. 28, 2023

(54) BATTERY MODULE

(71) Applicant: Contemporary Amperex Technology Co., Limited, Ningde (CN)

(72) Inventors: Fenggang Zhao, Ningde (CN); Junda Tu, Ningde (CN); Xiaobo Chen, Ningde (CN); Dan Shen, Ningde (CN); Xuehui Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/539,225

(22) Filed: Dec. 1, 2021

(65) Prior Publication Data

US 2022/0246975 A1 Aug. 4, 2022

Related U.S. Application Data

(63) Continuation of application No. 16/468,946, filed as application No. PCT/CN2018/119125 on Dec. 4, 2018, now Pat. No. 11,223,063.

(30) Foreign Application Priority Data

Aug. 31, 2018 (CN) .......................... 201811013207.7

(51) Int. Cl.

| | |
|---|---|
| *H01M 10/04* | (2006.01) |
| *H01M 10/613* | (2014.01) |
| *H01M 10/647* | (2014.01) |
| *H01M 10/653* | (2014.01) |
| *H01M 10/658* | (2014.01) |
| *H01M 50/293* | (2021.01) |
| *H01M 50/209* | (2021.01) |

(Continued)

(52) U.S. Cl.
CPC ..... *H01M 10/0481* (2013.01); *H01M 10/613* (2015.04); *H01M 10/647* (2015.04); *H01M 10/653* (2015.04); *H01M 10/658* (2015.04); *H01M 50/209* (2021.01); *H01M 50/293* (2021.01); *H01M 10/625* (2015.04); *H01M 50/291* (2021.01); *H01M 2200/10* (2013.01); *Y02E 60/10* (2013.01); *Y02P 70/50* (2015.11)

(58) Field of Classification Search
CPC . Y02E 60/10; H01M 10/0481; H01M 10/613; H01M 10/625; H01M 10/647; H01M 10/653; H01M 10/658; H01M 2200/10; H01M 50/209; H01M 50/291; H01M 50/293; Y02P 70/50
See application file for complete search history.

(56) References Cited

U.S. PATENT DOCUMENTS

| | | | |
|---|---|---|---|
| 2011/0070476 A1* | 3/2011 | Takahashi | ......... H01M 10/4207 429/120 |
| 2015/0333304 A1* | 11/2015 | Sekine | ................ H01M 10/625 429/153 |

\* cited by examiner

*Primary Examiner* — Lingwen R Zeng
(74) *Attorney, Agent, or Firm* — East IP P.C.

(57) ABSTRACT

The disclosure provides a battery module. The battery module comprises: a frame having an accommodation space; and a plurality of batteries successively arranged in the accommodation space in a thickness direction of the battery, wherein a partition is arranged between adjacent batteries, wherein the partition has a compressibility and a coefficient of compressibility $\delta_1$ at a pressure equal to or smaller than 2 MPa, which meets a relation $C_0 \times \delta_1 \leq A_0 \times 0.2$, wherein $C_0$ is an initial thickness of the partition, and $A_0$ is an initial thickness of the battery.

20 Claims, 5 Drawing Sheets

(51) Int. Cl.
*H01M 10/625* (2014.01)
*H01M 50/291* (2021.01)

BATTERY MODULE

CROSS REFERENCE

This application is a continuation of U.S. patent application Ser. No. 16/468,946, filed on Jun. 12, 2019, which is a National Stage of International Application No. PCT/CN2018/119125 filed on Dec. 4, 2018, which claims priority to Chinese Patent Application No. 201811013207.7 entitled "Battery Module" filed on Aug. 31, 2018. The aforementioned patent applications are incorporated herein by reference in their entireties.

TECHNICAL FIELD

The present disclosure relates to the technical field of energy storage, and in particular to a battery module.

BACKGROUND

A battery can convert chemical energy into electrical energy. The battery has stable voltage and current. It offers reliable performance, is friend to environment, has simple structure and is convenient to carry. The battery has become a main power source for electric vehicle. For high power and long run time, more than one battery cells is assembled into a battery module, or even more than one battery modules are assembled into a battery pack.

During charge-discharge of the battery cell of the battery module, its electrode plate will expand its volume due to different lithiation and delithiation states of active materials. The expansion of the electrode plate will inevitably cause stress in the battery cell. Such stress cannot be effectively released and thus will cause distortion of the battery core. Accordingly, the cycle performance of the battery will be adversely affected. Moreover, the volume expansion and distortion occurred during charge-discharge of the battery cell of the battery module will close inner gaps between layers, which will decrease permeability of electrolyte and thus degrade the cycle performance of the battery module. It is clear such situation cannot meet higher market requirement for cycle performance of battery module in recent years.

SUMMARY

In view of the above existing problems in the field, an object of the disclosure is to provide a battery module which has a good cycle performance.

In order to achieve the above object, the present disclosure discloses a battery module, comprising: a frame having an accommodation space; and a plurality of batteries successively arranged in the accommodation space in a thickness direction of the battery, wherein a partition is arranged between adjacent batteries, wherein the partition has a compressibility and a coefficient of compressibility $\delta_1$ at a pressure equal to or smaller than 2 MPa, which meets a relation $C_0 \times \delta_1 \leq A_0 \times 0.2$, wherein $C_0$ is an initial thickness of the partition, and $A_0$ is an initial thickness of the battery.

As compared to prior art, the disclosure provide following advantageous.

Since the battery module according to the disclosure comprises the partition having a compressibility between adjacent batteries, the partition can meet the expansion requirement of the battery, can act as a buffer to reduce the expansion rate of the batteries and effectively release stress in battery cells due to expansion of electrode plates. Moreover, the partition has a coefficient of compressibility $\delta_1$ at a pressure equal to or smaller than 2 MPa, which meets a relation $C_0 \times \delta_1 \leq A_0 \times 0.2$. Accordingly, the partition can prevent further expansion of the battery, thereby effectively restricting the stress within the battery cells and preventing excessive expansion of the battery cells. Therefore, the disclosure can effectively prevent the battery cells from being twisted, restrict the volume expansion of the battery cells, and ensure sufficient permeability of electrolyte in the battery cell such that the battery module has good cycle performance.

BRIEF DESCRIPTION OF THE DRAWINGS

In order to more clearly illustrate the technical solutions of the embodiments of the present disclosure, the drawings used in the embodiments of the present application will be briefly described below. For those skilled in the art, without any creative work, other drawings can be obtained from these figures.

REFERENCE SIGNS IN THE DRAWINGS

Figure 1:
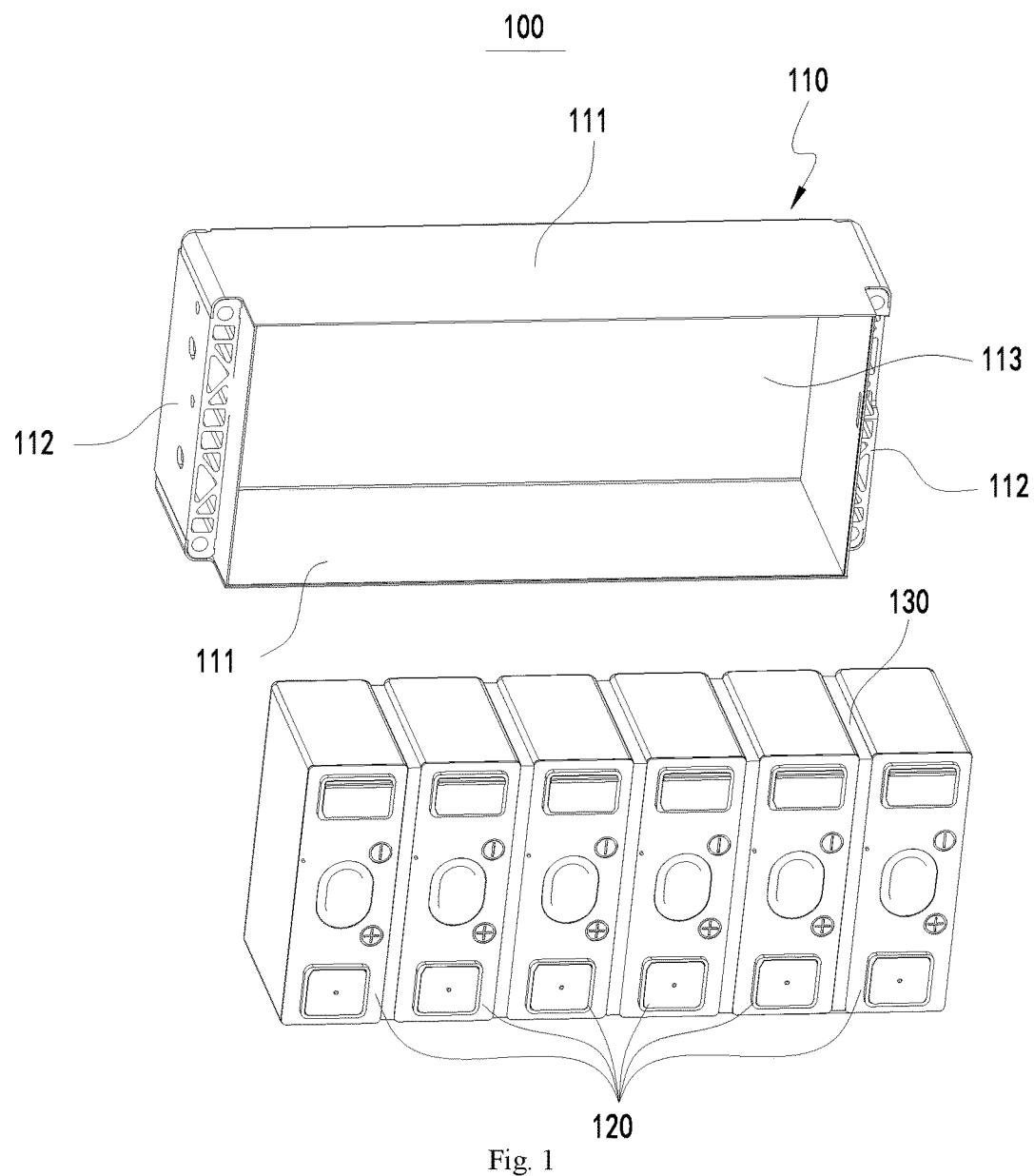
FIG. 1 is a structural schematic diagram of an exploded battery module according to an embodiment of the disclosure.

100 battery module;
110 frame;
111 side plate;
112 end plate;
113 accommodation space;
120 battery;
121 gap;
130 partition;
131 first surface;
132 second surface;
133 functional layer;
134 protrusion;
135 hole;
136 supporting layer.

DETAILED DESCRIPTION

In order to make the objects, technical solutions, and advantageous technical effects of the present disclosure more clear, the present disclosure will be further described in detail below with reference to the embodiments. It is to be understood that the embodiments described herein are merely illustrative of the invention and are not intended to limit the invention.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the description of the present disclosure, it should be noted that, unless otherwise stated, the meaning of "a plurality" is two or more; "no less than" and "no more than" shall be construed as including the number itself; the orientation or positional relationship indicated by the terms "upper", "lower", "inner", "outer" and the like are orientation or positional relationship based on the orientation shown in the drawings; it is merely simplified for convenience of describing the present disclosure and simplification of the description, and does not indicate or imply that the pointed device or element must have a particular orientation, be constructed and operated in a specific orientation, and therefore should not be construed as limiting the present disclosure.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

The above summary of the present disclosure is not intended to describe each disclosed embodiment or every implementation. The following description more particularly exemplifies the exemplary embodiments. In many places throughout the application, guidance is provided through a series of embodiments that can be used in various combinations. In each instance, the list is merely representative and should not be construed as exhaustive.

First, a battery module according to an aspect of the disclosure will be described. For better understanding of the disclosure, a battery module according to embodiments of the disclosure will be described below in detail with reference to FIGS. 1 to 8.

FIG. 1 schematically shows an exploded structure of a battery module according to an embodiment of the disclosure. As shown in FIG. 1, a battery module 100 according to an embodiment of the disclosure comprises a frame 110, batteries 120 and a partition 130.

Figure 2:
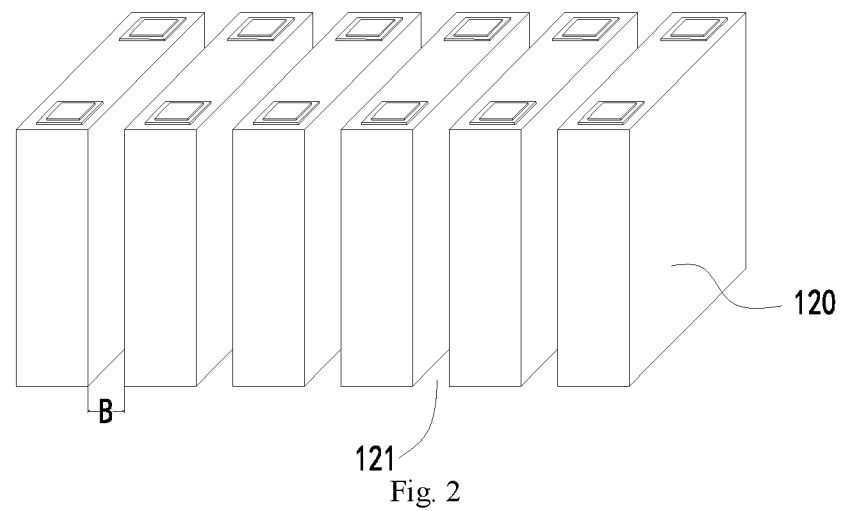
FIG. 2 is a schematic diagram of an arrangement of batteries according to an embodiment of the disclosure.

The frame 110 comprises two side plates 111 face to each other and spaced apart in a first direction and two end plates 112 face to each other and spaced apart in a second direction. The first direction intersects the second direction. Preferably, the first direction is perpendicular to the second direction. The adjacent side plates 111 connect with each other by the end plate 112. That is to say, the two side plates 111 and the two end plates 112 enclose an accommodation space 113. The batteries 120 are disposed successively in the accommodation space 113 along the second direction. The batteries 120 can be connected in series, in parallel or in mixed series-parallel arrangement. The second direction can be for example a thickness direction of the battery 120. Referring to FIG. 2, the adjacent batteries 120 are spaced apart. That is to say, there is a gap 121 between the adjacent batteries 120 to accommodate expansion and deformation of the batteries 120 in actual use. The gap 121 has a width B, which is generally in a range of 1 mm to 4 mm, such as 1.3 mm to 3.6 mm, or for example 1.5 mm to 2.7 mm.

Furthermore, the partition 130 is provided in the gap 121. The partition 130 has a compressibility and a coefficient of compressibility $\delta_1$ at a pressure equal to or smaller than 2 MPa, which meets a relation $C_0 \times \delta_1 \leq A_0 \times 0.2$, wherein $C_0$ is an initial thickness of the partition 130, and $A_0$ is an initial thickness of the battery 120. Referring to FIGS. 3 to 8, the partition 130 has a first surface 131 and a second surface 132 opposite to each other in its thickness direction. The first surface 131 is disposed to face one of the two adjacent batteries 120, and the second surface 132 is disposed to face the other of the two adjacent batteries 120. Preferably, the first surface 131 and the second surface 132 of the partition 130 can contact with the two adjacent batteries 120 respectively.

It will be appreciated that the first surface 131 and the second surface 132 are simply named to distinguish the two surfaces of the partition 130 in its thickness direction, and the disclosure is not limited to this. For example, the first surface 131 can be alternatively named as the second surface 132, while the second surface 132 can be alternatively named as the first surface 131.

It will also be appreciated that the frame 110 is not limited to the above structure. For example, the frame 110 can comprise two fixing members face to each other and spaced apart in the second direction, and the batteries 120 and the partitions 130 can be successively disposed between the two fixing members. The two fixing members can be connected through connecting members such that the batteries 120 and the partitions 130 are fixed between the two fixing members. The structure of the frame 110 is not specifically limited in the disclosure, so long as the frame 110 can receive and fix the batteries 120 and the partitions 130.

In the disclosure, the coefficient of compressibility of the partition 130 means a ratio of a thickness change $\Delta C$ of the partition 130 and the initial thickness $C_0$ of the partition 130. The initial thickness $C_0$ of the partition 130 means the thickness of the partition 130 in a new assembled battery module 100. The initial thickness $A_0$ of the battery 120 means the thickness of the battery 120 in the new assembled battery module 100.

For a battery module 100 after charge-discharge cycles, severe expansion will occur in the central regions on the main surface of the battery 120, and there will be smaller expansion in the outside regions, especially there will be almost no expansion at the peripheral regions. In such battery module 100, a thickness between the main surfaces of the battery 120 at its peripheral regions can be deemed as equal to the initial thickness $A_0$ of the battery 120. The partition 130 will be barely compressed in its regions corresponding to the above thickness of the battery 120, and a thickness of the partition 130 in these regions can be deemed as equal to the initial thickness $C_0$ of the partition 130. A maximum thickness at the central regions on the main surfaces of the battery 120 can be considered as a thickness of the expanded battery 120 after charge-discharge cycles, and the partition 130 will have a thickness $C_{10}$ its regions corresponding to the maximum thickness of the battery 120, wherein the thickness $C_{10}$ is a thickness of the partition 130 after being compressed by the batteries 120 after charge-discharge cycles. The thickness change $\Delta C$ of the partition 130 can be expressed as $\Delta C = C_0 - C_{10}$.

Since the battery module 100 according to embodiments of the disclosure comprises the partition 130 between adjacent batteries 120, when an expansion force occurs within the battery 120, the partition 130 can meet the expansion requirement of the battery 120 since it has compressibility. The partition 130 can act as a buffer to reduce the expansion rate of the batteries and effectively release stress in battery cells due to expansion of electrode plates. Moreover, the partition 130 has a coefficient of compressibility $\delta_1$ at a pressure equal to or smaller than 2 MPa, which meets a relation $C_0 \times \delta_1 \leq A_0 \times 0.2$. Accordingly, the partition 130 can prevent further expansion of the battery 120, thereby effectively restricting the stress within the battery cells and preventing excessive expansion of the battery cells. Therefore, the disclosure can effectively prevent the battery cells from being twisted and restrict the volume expansion of the battery cells, such that the gaps between the positive and negative electrode plates, between the positive electrode plate and the separator, and between the negative electrode plate and the separator can be in appropriate ranges. It ensures sufficient permeability of electrolyte in the battery cell such that the battery module 100 can have good cycle performance. Moreover, it can prevent short circuit in the battery due to twisting of the battery cell and squeezing of the electrode plate, and thus improve safety performance of the battery module 100.

It should be appreciated that although the battery 120 shown in FIGS. 1 and 2 comprises only one battery cell, the battery 120 can also comprise two or more battery cells. The two or more battery cells can be connected in series, in parallel or in mixed series-parallel arrangement. That is to say, the partitions 130 can be provided in the battery module 100 for every two or more battery cells. Therefore, the battery module 100 can have a smaller length and volume while its safety performance and cycle performance are improved.

The above battery cell comprises a positive electrode plate, a negative electrode plate, a separator and electrolyte. The positive and negative electrode plates can produce and conduct current. The positive electrode plate comprises a positive current collector and a positive active material layer disposed on at least one surface of the positive current collector. The negative electrode plate can be a lithium plate, or can comprise a negative current collector and a negative active material layer disposed on at least one surface of the negative current collector. The separator is disposed between the positive electrode plate and the negative electrode plate to separate them. The electrolyte is disposed between the positive electrode plate and the negative electrode plate to conduct ions.

The disclosure can be especially applied into a battery module comprising battery cells that have expansion benefit. As an example, the positive active material of said battery module comprising battery cells that have expansion benefit is $Li_{1+x}Ni_aMe_{1-a}O_{2-y}X_y$, wherein $-0.1 \leq x \leq 0.2$; $0 < a \leq 1$; $0 \leq y < 0.2$; Me is one or more of Mn, Co, Fe, Cr, Ti, Zn, V, Al, Zr and Ce; X is one or more of S, N, F, Cl, Br and I. Especially, a is expressed as $0.5 \leq a \leq 1$. For example, $Li_{1+x}Ni_aMe_{1-a}O_{2-y}X_y$ is $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$ and the like.

Preferably, the coefficient of compressibility $\delta_1$ of the partition 130 at a pressure equal to or smaller than 2 MPa meets a relation $C_0 \times \delta_1 \leq A_0 \times 0.1$. It can further improve the cycle performance and safety performance of the nickel-rich battery. Especially, the nickel-rich battery indicates the positive active material is $Li_{1+x}Ni_aMe_{1-a}O_{2-y}X_y$, such as $LiNi_{0.8}Co_{0.1}Mn_{0.1}O_2$, wherein $-0.1 \leq x \leq 0.2$; $0.7 \leq a \leq 1$; $0 \leq y < 0.2$; Me is one or more of Mn, Co, Fe, Cr, Ti, Zn, V, Al, Zr and Ce; X is one or more of S, N, F, Cl, Br and I.

In some embodiments, a pressure of 0.06 MPa to 0.35 MPa is applied to a mother plate to obtain the above partition 130. Therefore, the partition 130 can meet the assembling force requirement when the partition 130 is assembled in the gap 121 between the adjacent batteries 120, and the partition 130 can have good effect. As an example, the batteries 120 and the mother plates are alternatively disposed between the two end plates 112 to form an assembling group. The assembling group is pre-tightened with a pressure of 0.06 MPa to 0.35 MPa applied in the second direction. Thus, the mother plate is compressed to a predetermined extend to form the partition 130. The pre-tightened assembling group is disposed between the two side plates 111 of the frame 110. Finally, the end plates 112 and the side plates 111 are welded together to form a new battery module 100.

The mother plate has a thickness $C_1$. Preferably, $0 < C_1 - C_0$. It can provide a shearing force between the partition 130 and the battery cell such that the new assembled battery module 100 has a stable structure and shaking of the battery 120 and the partition 130 can be prevented. More preferably, $0 < C_1 - C_0 \leq 1$ mm. By maintaining a smaller thickness change from the mother plate to the partition 130, the partition 130 can have good effect and space utilization of the gap 121 can be improved.

In some embodiments, the partition 130 has a thickness $C_a$ at a pressure larger than 2 MPa and a thickness $C_b$ at a pressure of 2 MPa, which meet a relation $(C_b - C_a)/C_b \times 100\% \leq 0.15\%$. It ensures that the thickness of the partition 130 do not change substantially when the expansion force of the battery 120 is larger than 2 MPa. It prevents further expansion of the battery 120 such that the gaps between the positive and negative electrode plates, between the positive electrode plate and the separator, and between the negative electrode plate and the separator can be in appropriate ranges. It ensures sufficient permeability of electrolyte in the battery cell, and maintains stability of the positive and negative active material layers.

Furthermore, the partition 130 also has thermal insulation property. The thickness $C_b$ of the partition 130 at the pressure of 2 MPa is equal to above 0.015 mm, such as equal to above 0.1 mm. When a battery cell experiences thermal failure due to overheating, short circuit, overcharge and the like, the expansion force in the battery increases sharply, and the partition 130 will be compressed to its minimum thickness due to the expansion force. In this case, the partition 130 has still a thickness equal to or above 0.015 mm. It facilitates the thermal insulation of the partition 130, prevents immense heat in the battery cell experiencing the thermal failure from being transferred to adjacent battery cells. Therefore, it can prevent thermal failure of the battery module 100 due to spreading of the thermal failure of the battery cell, and the battery module 100 can have good safety performance.

In some optional embodiments, when the requirements for heat insulation and module assembling are met, the thickness $C_b$ of the partition 130 at the pressure of 2 MPa can be in a range of 0.015 mm to 4 mm, such as 0.1 mm to 2 mm.

Preferably, a thermal conductivity of the partition 130 at a temperature of 25° C. is equal to or smaller than 0.04 $W \cdot m^{-1} \cdot K^{-1}$. In this case, the partition 130 can have even better thermal insulation. At high temperature, the temperature difference between the first surface 131 and the second surface 132 of the partition 130 can be equal to or larger than 100° C. to 150° C., which significantly delays or even avoids propagation of thermal failure of adjacent battery cells.

In some embodiments, the partition 130 comprises a closed cell therein which has a diameter of 10 nm-120 μm, such as 15 μm-120 μm. The closed cell in the partition 130 inhibits the movement of the air molecule, and thereby reduces convective heat transfer of air. Moreover, the closed cell extends solid conduction path, restricts the solid thermal conduction and reduces thermal radiation. Therefore, the thermal insulation of the partition 130 can be greatly improved.

Furthermore, due to the compressibility of the partition 130, it will be compressed by the expansion force of the battery, and the diameter of the closed cell in the partition 130 will be decreased, or even the diameter of the closed cell will be smaller than a mean free path of air molecule. Therefore, the convective heat transfer of air can be prevented. Moreover, by increasing the cell density of the closed cells in the partition 130, it greatly extends the solid conduction path of heat, prevents the solid thermal conduction and reduces thermal radiation. Therefore, the thermal insulation of the partition 130 can be greatly improved.

Preferably, the partition 130 has a closed cell percentage of 60%-98%. More preferably, the partition 130 has a closed cell percentage of 80%-95%.

Referring to FIGS. 3 to 8, the above partition 130 comprises a functional layer 133, which is exposed from at least the first surface 131. However, as stated above, the functional layer 133 can be alternatively exposed from at least the second surface 132. Alternatively, the functional layer 133 can be exposed from the first surface 131 and the second surface 132.

The functional layer 133 comprises polymer with compressibility. The above characteristics of the partition 130 are mainly contributed by the functional layer 133. For example, the above polymer can be one or more of melamine polymer, polyamide (PA, commonly known as nylon), p-phenylene terephthalamide (PPTA, commonly known as aramid), polyimide (PI), polyethylene terephthalate (PET), polybutylene terephthalate (PBT), polyethylene naphthalate (PEN), polycarbonate (PC), polyethylene (PE), polypropylene (PP), polypropylene (PPE), acrylonitrile-butadiene-styrene copolymer (ABS), polyvinyl alcohol (PVA), polystyrene (PS), polyvinyl chloride (PVC), polyvinylidene fluoride (PVDF), polytetrafluoroethylene (PTEE), sodium polystyrene sulfonate (PSS), silicone rubber, polyoxymethylene (POM), polyphenylene ether (PPO), polyethylene glycol (PEG), aerogel, cellulose, epoxy resin, phenolic resin, their derivatives, their crosslinks and their copolymers.

Preferably, carbonization can take place in the functional layer 133 at a temperature of 400° C.-650° C. such that a carbon protective layer is formed. The carbon protective layer can prevent further thermal decomposition of the polymer, and prevent internal thermal decomposition products from being diffused to combust. It ensures the partition 130 has good effect, and its reliability is improved. Moreover, the heat generated when the battery experiences the thermal failure will melt the aluminum metal. Since the melting point of carbon is well above the melting point of the aluminum metal and carbon has a compact structure, the carbon protective layer can avoid liquid aluminum from permeating into heat absorbing surfaces of the adjacent battery cells, and a few of liquid aluminum can form carbon aluminum composite layer along with surface carbon on the carbon protective layer. It can reduce the liquid aluminum and prevent the permeation of the liquid aluminum, such that the carbon protective layer can protect the aluminum metal in the adjacent battery cells, and can prevent thermal failure of the adjacent battery cells due to liquid aluminum at a high temperature in the battery cell experiencing the thermal failure.

Preferably, cross-linking can take place in the functional layer 133 at a temperature of 400° C.-650° C. such that cross-linked solid matter is produced, which forms a cross-linking protective layer. The cross-linking protective layer can have the same effect as the above carbon protective layer.

The above polymer is preferably nitrogen-containing polymer, such as one or more of melamine polymer, polyamide (PA, commonly known as nylon), p-phenylene terephthalamide (PPTA, commonly known as aramid) and polyimide (PI). When the nitrogen-containing polymer is thermally decomposed at a high temperature, it is easy to release noncombustible gas, such as nitrogen, nitrogen oxide, water vapor and the like. The thermal decomposition of the nitrogen-containing polymer and the generation of the noncombustible gas will consume a lot of heat, which will substantially reduce the surface temperature of the functional layer 133. Moreover, the noncombustible gas such as nitrogen will dilute oxygen in the battery module 100 and combustible gas generated when the polymer is thermally decomposed, and can react with the oxygen and the combustible gas such that the oxygen and the combustible gas will be converted into noncombustible gas, such as nitrogen, nitrogen oxide, water vapor and the like. According to chain reaction theory of combustion, when comburent and combustible for maintain the combustion are separated from each other and consumed, flame density in the combustion region will be reduced. Finally, the combustion reaction rate decreases and the combustion terminates, thus good flame retardation is achieved.

The nitrogen-containing polymer is preferably melamine polymer, such as melamine formaldehyde resin and its derivatives. When the melamine polymer is thermally decomposed, it can produce more noncombustible gas, such as nitrogen, nitrogen oxide, water vapor and the like, and can form a vitreous or stable foam covering layer at a high temperature (generally 400° C.-600° C.), which can prevent oxygen and combustible gas from escaping outward. When such nitrogen-containing polymer is heated, it is easy to form the cross-linking protective layer or the carbon protective layer to protect adjacent battery cells.

For example, for melamine formaldehyde resin, a monomer containing unsaturated bonds is made from melamine and formaldehyde by addition reaction to contain, which then is cross-linked with formaldehyde to form melamine formaldehyde resin. Melamine formaldehyde resin can be further provided with a foaming agent such as pentane foaming agent to initiate a foaming reaction so as to improve the closed cell percentage.

Figure 3:
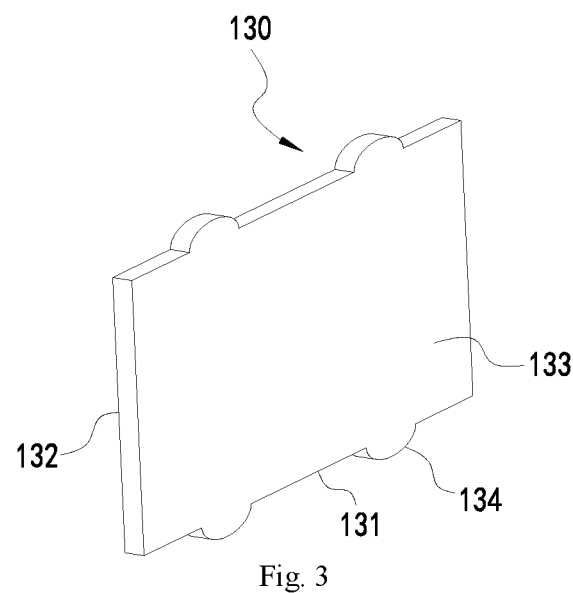
FIG. 3 is a structural schematic diagram of a partition according to an embodiment of the disclosure.
Figure 4:
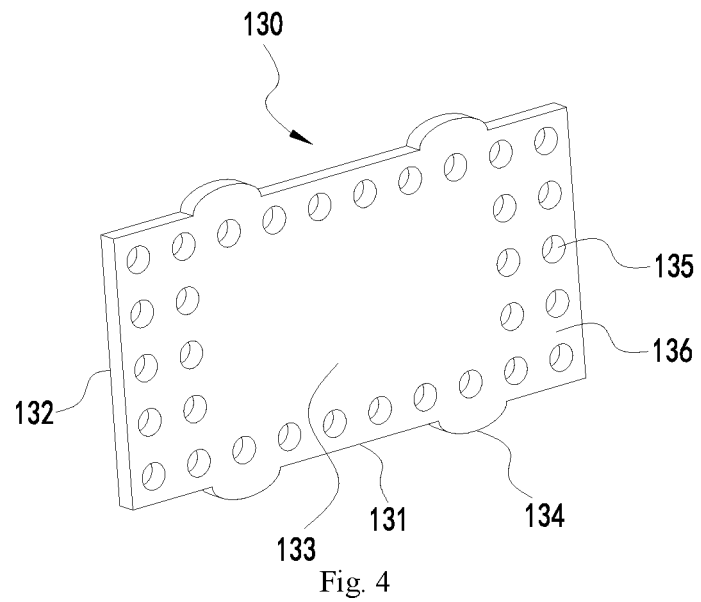
FIG. 4 is a structural schematic diagram of a partition according to another embodiment of the disclosure.

Referring to FIGS. 3 and 4, the partition 130 can have a single layer structure. As an example, the partition 130 in a single layer structure comprises a central region and an outside region which encloses the central region at a periphery of the central region. The functional layer 133 is provided at least in the central region of the partition 130. At the outside region, the functional layer 133 or a supporting layer 136 can be provided there. Generally, as stated above, severe expansion will occur in the central regions on the main surface of the battery, and there will be smaller expansion in the outside regions. That is why functional layer 133 can be only provided in the central region of the partition 130.

Preferably, the central region has an area which is 40%-100% of an area of the partition 130. More preferably, the central region has an area which is 40%-65% of an area of the partition 130, such as 40%-50%.

One or more holes 135 can be disposed in the outside region of the partition 130. The above holes 135 can be one or more of through hole or blind hole. At one aspect, it can facilitate appropriate expansion of the outside region of the battery, which then shares the expansion force in the central region of the battery. On the other aspect, the holes can reduce material and cost.

The holes 135 at the outside region have a total area which is equal to or less than 40% of the area of the partition 130, such as 25%-35%. It can ensure the supporting strength of the outside regions.

The shape of the hole 135 will not be specifically limited, and can be square, rhombus, polygon, circle, oval, irregular shape and the like.

It should be appreciated that when blind holes are provided at the outside region, the blind hole can be provided at one or both of the first surface 131 and the second surface 132 of the partition 130.

As an example, as shown in FIG. 3, the functional layer 133 is disposed at both the central region and the outside region of the partition 130, i.e., the partition 130 has a single layer structure composed of the functional layer 133.

As an example, as shown in FIG. 4, the functional layer 133 is disposed at the central region of the partition 130, and the supporting layer 136 is disposed at the outside region of the partition 130. The supporting layer 136 encloses the functional layer 133 at its periphery. Accordingly, the partition 130 has a single layer composite structure composed of the functional layer 133 and the supporting layer 136. It can reduce functional material and cost.

Preferably, the area of the functional layer 133 is 40%-100% of the area of the partition 130. More preferably, the area of the functional layer 133 is 40%-65% of the area of the partition 130, such as 40%-50%.

The supporting layer 136 comprises hard polymer, such as one or more of polyethylene terephthalate (PET), polybutylene terephthalate (PBT), polyethylene naphthalate (PEN), polycarbonate (PC), polyethylene (PE), polypropylene (PP) and polypropylene (PPE). However, the hard polymer is not limited to the above. The above hard polymer means it has a much smaller coefficient of compressibility at a same pressure as compared to the functional layer 133. For example, at a pressure of 0.06 MPa-2 MPa, the supporting layer 136 has a coefficient of compressibility of 0-10%, such as 0.1%-5%.

Figure 5:
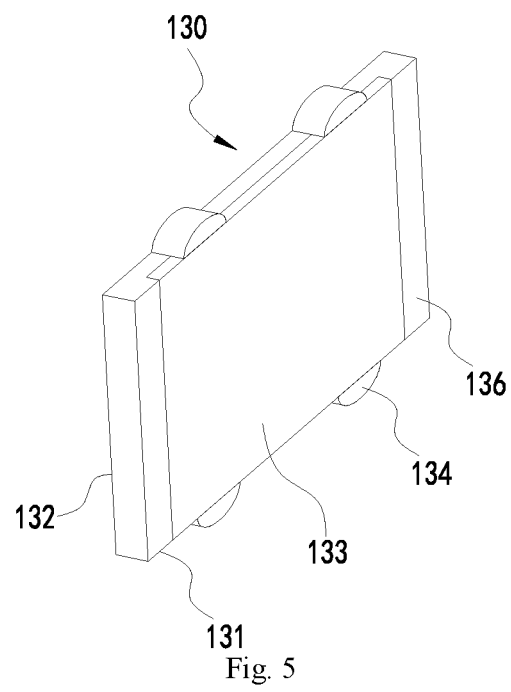
FIG. 5 is a structural schematic diagram of a partition according to another embodiment of the disclosure.
Figure 6:
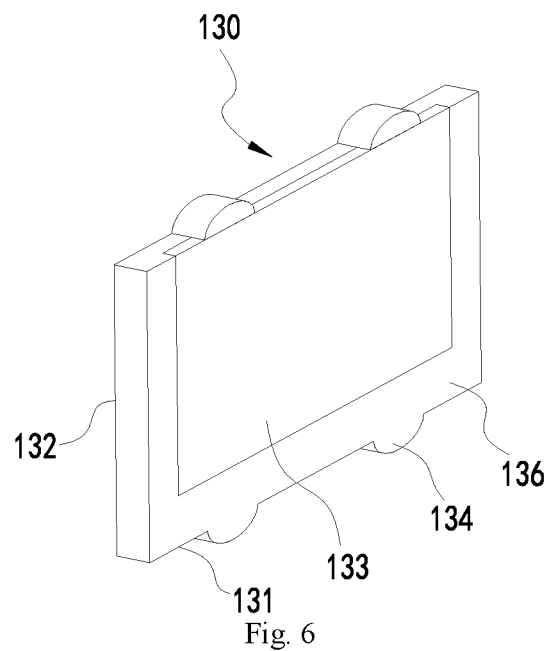
FIG. 6 is a structural schematic diagram of a partition according to another embodiment of the disclosure.
Figure 7:
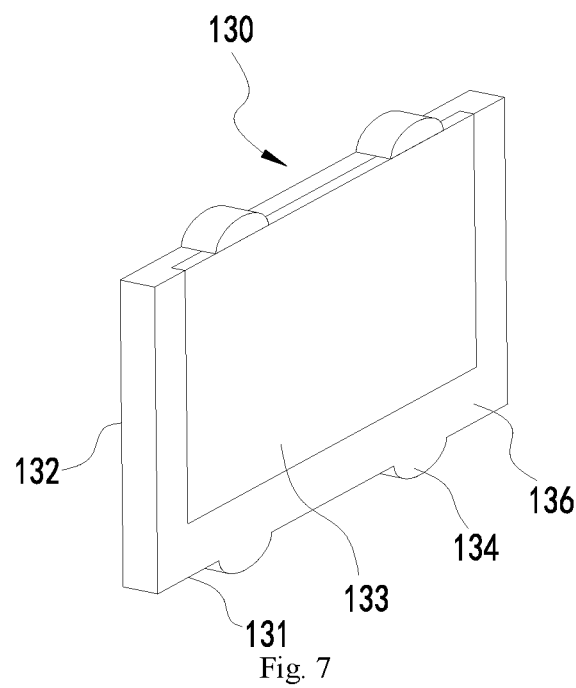
FIG. 7 is a structural schematic diagram of a partition according to another embodiment of the disclosure.

The partition 130 can also have a multi layer structure. In some embodiments, as shown in FIGS. 5 to 7, the partition 130 has a multi-layer composite structure composed of the supporting layer 136 and the functional layer 133. The functional layer 133 and the supporting layer 136 are stacked such that the supporting layer 136 can support the functional layer 133. Specifically, the supporting layer 136 comprises two opposite surfaces. The functional layer 133 can be provided at any of the two surfaces of the supporting layer 136, or can be provided at both surfaces of the supporting layer 136.

The supporting layer 136 and the functional layer 133 can be attached through squeezing force from the battery cells, or can be combined by bonding or external film encapsulation. The disclosure is not limited to the above.

The supporting layer 136 can comprise the above hard polymer. The disclosure is not limited to the above material.

As described above, the functional layer 133 can be disposed only at the central region of the partition 130. Therefore, in some embodiments, the central region of the supporting layer 136 can comprise a recess, and the functional layer 133 can be arranged in the recess.

The supporting layer 136 has two opposite surfaces. The central region of one of the two surfaces of the supporting layer 136 is inward depressed to form the recess for receiving the functional layer 133. Alternatively, the recesses can be formed in the central regions by inward depressing at both surfaces of the supporting layer 136 to receive the functional layers 133 respectively. The shape of the recess is not specifically limited, and can be square, polygon, circle, oval, irregular shape and the like.

Preferably, the exposed surface of the functional layer 133 is flush with the surface of the supporting layer 136.

As an example, as shown in FIG. 5, the central region of one of the two surfaces of the supporting layer 136 is inwardly depressed to form the recess for receiving the functional layer 133. Two ends of the recess extend to respective edges of the supporting layer 136. Accordingly, the recess is a U-shaped recess. The functional layer 133 is disposed in the recess.

As an example, as shown in FIG. 6, the central region of one of the two surfaces of the supporting layer 136 is inwardly depressed to form the recess for receiving the functional layer 133. One end of the recess extends to an edge of the supporting layer 136 such that a side opening is formed at the edge. The functional layer 133 is disposed in the recess.

As another example, as shown in FIG. 7, the central region of one of the two surfaces of the supporting layer 136 is inwardly depressed to form the recess for receiving the functional layer 133. The recess is closed at every side. The functional layer 133 is disposed in the recess.

Preferably, the recess has an area which is 40%-100% of a total area of the partition 130, i.e., the area of the functional layer 133 is 40%-100% of the total area of the partition 130. More preferably, the area of the recess is 40%-65% of a total area of the partition 130, i.e., the area of the functional layer 133 is 40%-65% of the total area of the partition 130.

The partition 130 has side surface which are connected with edges of the first surface 131 and the second surface 132 respectively. Furthermore, at least one protrusion 134 is provided on the side surface.

One protrusion 134 can be arranged corresponding to a positive electrode terminal or a negative electrode terminal of the battery cell. Alternatively, both of two protrusions 134 can be arranged corresponding to a positive electrode terminal and a negative electrode terminal of the battery cell, respectively. The one or two protrusions 134 can provide positioning function such that the partition 130 can be conveniently aligned with the battery cell.

Two or more protrusions 134 can be disposed at the bottom side of the partition 130 to provide supporting effect.

In some embodiments, on the side surface of the partition 130 corresponding to the side plate 111 of the frame 110, at least one protrusion 134 can be arranged corresponding to the side plate 111. On the side surface of the partition 130 corresponding to a top plate of the frame 110, at least one protrusion 134 can be arranged corresponding to the top plate. On the side surface of the partition 130 corresponding to a bottom plate of the frame 110, at least one protrusion 134 can be arranged corresponding to the bottom plate. These protrusions can provide buffering effect. When a compression force is applied to the partition 130, since material expands in all directions, the material may extend beyond the periphery of the battery cell to contact or even press the frame 110. On one side, excess material accumulates outside of the gap 121 such that the gap 121 will have a large positional deviation and thus cannot effectively protect the battery 120. On the other side, since the partition 130 presses the frame 110, one or more of the side plates 111, the top plate and the bottom plate will have large assembly deviation and thus cannot fit with the end plate 112. In this case, there will be wide welding seam in welding zone between the end plate 112 and one or more of the side plates 111, the top plate and the bottom plate, or even the welding cannot be normally performed. Through the buffering effect of these protrusions 134, the above problem can be effectively solved.

Furthermore, the disclosure further provides a battery pack comprising one or more categories of the above battery modules 100. There are two or more battery modules 100, which can be connected in series, in parallel or in mixed series-parallel arrangement. Since the battery pack according to embodiments of the disclosure comprises the battery module 100 according to embodiments of the disclosure, the battery pack also has good cycle performance and safety performance.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available or synthesized through routine methods, and used directly as they were originally received, and all instruments used in the examples are commercially available.

Example 1

Preparation of Positive Electrode Plate

A positive slurry is prepared by mixing $LiNi_{0.8}Co_{0.1}Mn_{0.1}O_2$ as positive active material, conductive carbon black and polyvinylidene difluoride (PVDF) as a binder at a weight ratio 8:1:1 in N-Methyl-2-pyrrolidone (NMP) as a solvent and stirring them uniformly. The positive slurry is coated onto an aluminum foil of a positive current collector. After drying, cold pressing, slitting and slicing process, a positive electrode plate is obtained.

Preparation of Negative Electrode Plate

A negative slurry is prepared by mixing synthetic graphite as negative active material, conductive carbon black, carboxymethyl cellulose (CMC) as a thickening agent and styrene-butadiene rubber (SBR) as a binder at a weight ratio 89:6:3:2 in deionized water as a solvent and stirring them uniformly. The negative slurry is coated onto a copper foil of a negative current collector. After drying, cold pressing, slitting and slicing process, a negative electrode plate is obtained.

Preparation of Electrolyte

An organic solvent is prepared by uniformly mixing ethylene carbonate (EC), ethyl methyl carbonate (EMC) and diethyl carbonate (DEC) at a volume ratio 1:1:1. An electrolyte is prepared by dissolving $LiPF_6$ with a concentration of 1 mol/L into the above organic solvent.

Preparation of Battery Cell

A battery cell is prepared by successively stacking the positive electrode plate, a separator and the negative electrode plate, winding them to form a battery core, placing the battery core into an aluminum case and performing subsequent processes including top-side sealing, electrolyte injection and the like, wherein the separator comprises a PP/PE/PP composite film and is disposed between the positive electrode plate and the negative electrode plate to separate them.

Preparation of Battery Module

Figure 8:
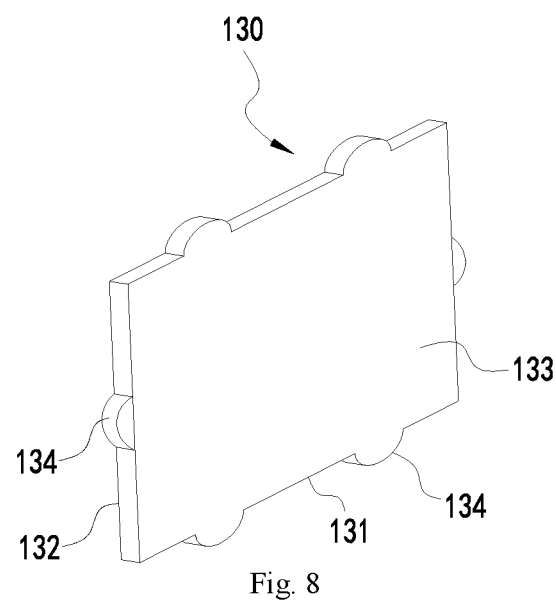
FIG. 8 is a structural schematic diagram of a partition according to another embodiment of the disclosure.

Six battery cells as prepared above are arranged side by side, and mother plates are disposed between every two adjacent battery cells. A pressure of 0.2 MPa is applied to an assembly including the battery cells, the mother plates and two end plates, and thereby the mother plate is compressed to a predetermined extend to form a partition, which has a structure as shown in FIG. 8. Then, the assembly is disposed between two side plates and is welded to an assembly including the end plates and the side plates. After that, the six battery cells are connected in series to form a battery module. Specific parameters are shown in Table 1.

Examples 2-10

Different from Example 1, relevant parameters of the partition are adjusted, as shown in Table 1.

Example 11

Different from Example 2, the partitions are disposed between every two adjacent batteries, each battery comprises two battery cells, and relevant parameters of the partition are adjusted, as shown in Table 1.

Example 12

Different from Example 2, the positive active material is $LiNi_{0.5}Co_{0.2}Mn_{0.3}O_2$.

Comparative Example 1

Different from Example 1, there is no partition between the battery cells in the battery module, and a width of the gap between two adjacent battery cells is kept at 2.6 mm by fixing holder.

Comparative Example 2

Different from Example 1, there is no partition between the battery cells in the battery module, and a width of the gap between two adjacent battery cells is kept at 3.6 mm by fixing holder.

Test Section

1. Thermal Propagation Test of Battery Module

After sufficient charge-discharge cycles of a new battery module, a compression force applied to a partition in the battery module comes up to 2 MPa. The battery module is charged at a temperature of 25±3° C. and an atmospheric pressure of 101 KPa, wherein the battery cell in the battery module is charged at a constant current at a rate of 1 C until its voltage reaches 4.2V and then charged at a constant voltage until the current is equal to or less than 0.05 C. The battery module is then placed in a nail penetration testing equipment. The testing environment is maintained at a temperature of 25±3° C. and an atmospheric pressure of 101 KPa. A fire resistant steel nail with a diameter of 3.0 mm and a taper angle of 30°-60° is used to penetrate at a speed of 0.1 mm/s a first battery cell of the battery module at its central position. The order of battery cells are calculated from an overall negative terminal to an overall positive terminal. The penetration depth is 5 mm-10 mm. The nail penetration is stopped when the first battery cell comes into thermal failure. Thermal propagation in the battery module is detected, and thermal failure times in second to sixth battery cells are recorded. A starting point of the thermal failure times in second to sixth battery cells is the time when the first battery cell comes into thermal failure.

2. Cycle Performance Test of Battery Module

A new battery module is charged at a temperature of 25±3° C. and an atmospheric pressure of 101 KPa, wherein the battery cell in the battery module is charged at a constant current at a rate of 1 C until its voltage reaches 4.2V and then charged at a constant voltage until the current is equal to or less than 0.05 C, and after that, discharged at a constant current at a rate of 1 C until its voltage reaches 3.0V. This is a charge-discharge cycle. The discharge capacity at this time is recorded as the discharge capacity of the first cycle of the lithium-ion secondary battery. 1000 cycles of the charge-discharge testing are performed according to the above method, and the discharge capacity at each cycle is recorded.

Capacity retention rate of the lithium-ion secondary battery (%) after 1000 cycles=discharge capacity at the $1000^{th}$ cycle/the discharge capacity at the first cycle×100%.

3. Direct Current Resistance (DCR) Test of Battery Module

A new battery module is charged at a temperature of 25±3° C. and an atmospheric pressure of 101 KPa, wherein the battery cell in the battery module is charged at a constant current at a rate of 1 C until its voltage reaches 4.2V and then charged at a constant voltage until the current is equal to or less than 0.05 C and after that, discharged at a constant current at a rate of 1 C until the state of charge (SOC) of the lithium-ion secondary battery is adjusted to 20% of its full charge capacity. After resting for 60 min, it is discharged at a constant current at a rate of 4 C for 30 s, and is subjected to a DCR test with a recording interval time of 0.1 s. An initial DCR of the battery module is obtained. 1000 cycles of the charge-discharge testing are performed according to the above method, and the DCR after the 1000 cycles is recorded.

The test results of Examples 1 to 12 and Comparative Examples 1-2 were shown in Table 2 below.

TABLE 1

| | | Partition | | | | |
|---|---|---|---|---|---|---|
| | Material | Initial thickness of mother plate $C_1$ mm | Initial thickness $C_0$ mm | Thickness after 1000 cycles mm | Compressed thickness at 2 MPa mm | Battery cell Initial thickness mm |
| Example 1 | Melamine formaldehyde resin | 0.7 | 0.6 | 0.16 | 0.015 | 26 |
| Example 2 | Melamine formaldehyde resin | 4.0 | 3.6 | 1.0 | 1.0 | 26 |
| Example 3 | Melamine formaldehyde resin | 2.8 | 2.6 | 0.7 | 0.65 | 26 |
| Example 4 | Modified polypropylene MPP | 2.7 | 2.6 | 0.55 | 0.4 | 26 |
| Example 5 | Hard polypropylene | 2.7 | 2.6 | 1.9 | 1.8 | 26 |
| Example 6 | Melamine formaldehyde resin | 1.8 | 1.6 | 0.45 | 0.44 | 52 |
| Example 7 | Modified polypropylene MPP | 1.7 | 1.6 | 0.35 | 0.2 | 52 |
| Example 8 | Silica aerogel | 1.7 | 1.6 | 1.0 | 0.7 | 52 |
| Example 9 | Silica aerogel | 2.8 | 2.6 | 1.6 | 1.5 | 52 |
| Example 10 | Melamine formaldehyde resin | 4.0 | 3.6 | 1.0 | 1.0 | 79 |
| Example 11 | Melamine formaldehyde resin | 4.0 | 3.6 | 1.0 | 1.0 | 26 |
| Example 12 | Melamine formaldehyde resin | 5.5 | 5.0 | 1.4 | 1.2 | 26 |
| Comparative Example 1 | / | / | / | / | / | 26 |
| Comparative Example 2 | / | / | / | / | / | 26 |

TABLE 2

| | Thermal propagation | | | | | | |
|---|---|---|---|---|---|---|---|
| | Thermal failure time of second battery cells | Thermal failure time of third battery cells | Thermal failure time of fourth battery cells | Thermal failure time of fifth battery cells | Thermal failure time of sixth battery cells | Capacity retention rate after 1000 cycles % | DCR after 1000 cycles mΩ |
| Example 1 | 135 | 350 | 660 | 927 | 1212 | 82 | 0.98 |
| Example 2 | 237 | 627 | 1187 | 1942 | 2972 | 92 | 0.80 |
| Example 3 | 200 | 425 | 954 | 1430 | 2100 | 94 | 0.80 |
| Example 4 | 40 | 85 | 125 | 155 | 175 | 93 | 0.85 |
| Example 5 | 50 | 110 | 160 | 195 | 220 | 80 | 1.10 |
| Example 6 | 200 | 575 | 1181 | 2011 | 3131 | 88 | 0.96 |
| Example 7 | 40 | 80 | 115 | 135 | 145 | 87 | 0.98 |
| Example 8 | 300 | 860 | 1565 | 2875 | 3630 | 80 | 1.00 |
| Example 9 | 540 | 1200 | 1840 | 3040 | 4530 | 86 | 0.98 |
| Example 10 | 200 | 590 | 1095 | 2045 | 3240 | 91 | 0.92 |
| Example 11 | 10 | 300 | 320 | 580 | 600 | 90 | 0.96 |
| Example 12 | 255 | 735 | 1470 | 2480 | 3720 | 94 | 0.94 |
| Comparative Example 1 | 60 | 115 | 180 | 205 | 258 | 76 | 1.15 |
| Comparative Example 2 | 35 | 80 | 130 | 150 | 160 | 40 | 2.45 |

As can be seen from the comparison of Examples 2, 10, 11 to Comparative Example 2 and the comparison of Examples 3, 4, 5, 9 to Comparative Example 1, when the partition is disposed between the batteries, the capacity retention rate of the battery module after 1000 cycles is significantly improved, the DCR of the battery module after 1000 cycles is significantly reduced. Therefore, the cycle performance of the battery module according to the disclosure is significantly improved.

As can be seen from the test results of the Examples 1 to 12, after 1000 cycles at a rate of 1 C, the capacity retention rate of the battery module according to the disclosure is still equal to or above 80% of its initial capacity, such as equal to or above 90%. After 1000 cycles of the battery module at a rate of 1 C, its direct current resistance is still equal to or below 1.10 mΩ, such as equal to or below 1.00 mΩ, especially equal to or below 0.85 mΩ, more especially equal to or below 0.80 mΩ. The battery module according to embodiments of the disclosure has good cycle performance.

As can be seen from the comparison of Examples 1-3, 6, 8-12 to Comparative Examples 1-2, when the partition is disposed between the batteries, the thermal failure propagation time of the battery module is significantly increased while the battery module has good cycle performance. The thermal failure propagation can be greatly retarded, thus the battery module has good safety performance.

The above is only the specific embodiment of the present application, but the scope of the present application is not limited thereto. Various equivalent modifications and variations of the present application that can be easily conceived by those skilled in the art are intended to be included within the scope of the present application. Therefore, the scope of the invention should be determined by the scope of the claims.

What is claimed is:

1. A battery module, comprising:
   a frame having an accommodation space; and
   a plurality of batteries successively arranged in the accommodation space in a thickness direction of the battery,
   wherein a partition is arranged between adjacent batteries, wherein the partition has a compressibility and a coefficient of compressibility $\delta_1$ at a pressure equal to or smaller than 2 MPa, which meets a relation $C_0 \times \delta_1 \leq A_0 \times 0.2$, wherein $C_0$ is an initial thickness of the partition, and $A_0$ is an initial thickness of the battery; the partition comprises a closed cell therein.

2. The battery module according to claim 1, wherein the coefficient of compressibility $\delta_1$ of the partition at a pressure equal to or smaller than 2 MPa meets a relation $C_0 \times \delta_1 \leq A_0 \times 0.1$.

3. The battery module according to claim 1, wherein the partition has a thickness $C_a$ at a pressure larger than 2 MPa and a thickness $C_b$ at a pressure of 2 MPa, which meet a relation $(C_b - C_a)/C_b \times 100\% \leq 0.15\%$.

4. The battery module according to claim 3, wherein thickness $C_b$ of the partition at a pressure of 2 MPa is equal to or larger than 0.015 mm.

5. The battery module according to claim 1, wherein a thermal conductivity of the partition at a temperature of 25° C. is equal to or smaller than 0.04 W·m$^{-1}$·K$^{-1}$.

6. The battery module according to claim 1, wherein the closed cell has a diameter of 10 nm-120 μm.

7. The battery module according to claim 1, wherein the partition has a closed cell percentage of 60%-98%.

8. The battery module according to claim 1, wherein the partition has a first surface and a second surface opposite to each other in its thickness direction, wherein the first surface contacts with one of two adjacent batteries, and the second surface contacts with the other of the two adjacent batteries.

9. The battery module according to claim 8, wherein the partition has side surfaces which are connected with edges of the first surface and the second surface respectively, wherein at least one protrusion is provided on the side surface.

10. The battery module according to claim 7, wherein the partition has the closed cell percentage of 80%-95%.

11. The battery module according to claim 8, wherein the partition comprises a functional layer which is exposed from at least the first surface.

12. The battery module according to claim 11, wherein the functional layer is provided in a central region of the partition, and the functional layer has an area which is 40%-100% of an area of the partition.

13. The battery module according to claim 12, wherein the partition further comprises a supporting layer, wherein the partition has a composite structure composed of the supporting layer and the functional layer.

14. The battery module according to claim 11, wherein the functional layer comprises polymer.

15. The battery module according to claim 14, wherein the functional layer comprises nitrogen-containing polymer.

16. The battery module according to claim 15, wherein the functional layer comprises melamine polymer.

17. The battery module according to claim 12, wherein the functional layer has an area which is 40%-65% of an area of the partition.

18. The battery module according to claim 9, wherein one of the at least one protrusion is arranged corresponding to a positive electrode terminal or a negative electrode terminal of the battery cell.

19. The battery module according to claim 9, wherein two of the at least one protrusion are arranged corresponding to a positive electrode terminal and a negative electrode terminal of the battery cell, respectively.

20. The battery module according to claim 9, wherein at least one of the at least one protrusion is arranged corresponding to a side plate of the frame.

\* \* \* \* \*